(12) United States Patent
Buehler et al.

(10) Patent No.: US 9,652,901 B2
(45) Date of Patent: May 16, 2017

(54) HEALTH MANAGEMENT UNIT AND METHOD FOR MONITORING HEALTH INFORMATION AND TRANSMITTING INFORMATION FROM THE AIRCRAFT

(71) Applicant: GE AVIATION SYSTEMS LLC, Grand Rapids, MI (US)

(72) Inventors: Eric Daniel Buehler, Grand Rapids, MI (US); Joseph Bernard Steffler, Grand Rapids, MI (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 0 days.

(21) Appl. No.: 15/031,419

(22) PCT Filed: Oct. 24, 2013

(86) PCT No.: PCT/US2013/066516
§ 371 (c)(1),
(2) Date: Apr. 22, 2016

(87) PCT Pub. No.: WO2015/060848
PCT Pub. Date: Apr. 30, 2015

(65) Prior Publication Data
US 2016/0260265 A1 Sep. 8, 2016

(51) Int. Cl.
*H04B 7/00* (2006.01)
*G07C 5/00* (2006.01)
*G08C 25/00* (2006.01)
*H04B 7/185* (2006.01)
*H04Q 9/00* (2006.01)
(Continued)

(52) U.S. Cl.
CPC ............ *G07C 5/008* (2013.01); *B64D 45/00* (2013.01); *G08C 25/00* (2013.01); *G08G 5/0013* (2013.01); *H04B 7/02* (2013.01); *H04B 7/18506* (2013.01); *H04L 67/12* (2013.01); *H04Q 9/00* (2013.01);
(Continued)

(58) Field of Classification Search
CPC .................................. H04B 1/38; H04W 84/06
USPC ......... 455/427, 500, 517, 431, 552.1, 553.1, 455/550.1, 129, 84, 140, 422.1, 403, 455/426.1, 426.2, 512, 509, 450, 445,
(Continued)

(56) References Cited

U.S. PATENT DOCUMENTS 6,928,345 B2 8/2005 Quinn
7,729,263 B2 6/2010 True et al.
(Continued)

FOREIGN PATENT DOCUMENTS

| EP | 1315315 A2 | 5/2003 |
| EP | 2129006 A2 | 12/2009 |
| FR | 2914802 A1 | 10/2008 |

OTHER PUBLICATIONS

International Search Report and Written Opinion issued in connection with corresponding PCT Application No. PCT/US2013/066516 dated Jun. 30, 2014.

*Primary Examiner* — Keith Ferguson
(74) *Attorney, Agent, or Firm* — GE Global Patent Operation; William S. Munnerlyn

(57) ABSTRACT

A health management unit for an aircraft and method of monitoring health information of an aircraft and transmitting information from the aircraft including determining capabilities of one or more radios onboard the aircraft, selecting one of the multiple radios to transmit the transmission based, and transmitting the transmission utilizing the selected radio.

15 Claims, 2 Drawing Sheets

(51) Int. Cl.
*G08G 5/00* (2006.01)
*B64D 45/00* (2006.01)
*H04B 7/02* (2017.01)
*H04L 29/08* (2006.01)
*H04W 84/04* (2009.01)
*H04W 84/12* (2009.01)

(52) U.S. Cl.
CPC ... *B64D 2045/0085* (2013.01); *H04W 84/042* (2013.01); *H04W 84/12* (2013.01)

(58) Field of Classification Search
USPC ....... 455/12.1, 507, 508; 370/338, 343, 310, 370/312
See application file for complete search history.

(56) References Cited

U.S. PATENT DOCUMENTS

| | | |
|---|---|---|
| 7,999,667 B2 | 8/2011 | Carralero et al. |
| 8,195,231 B2 | 6/2012 | Ring |
| 8,346,700 B2 | 1/2013 | Nwadiogbu et al. |
| 8,676,191 B2 | 3/2014 | Soumier et al. |
| 2002/0003790 A1* | 1/2002 | Heppe ............... H04B 7/0802 370/338 |
| 2004/0008253 A1 | 1/2004 | Monroe |
| 2009/0298451 A1* | 12/2009 | Malaga ............... H04B 1/40 455/129 |
| 2010/0075614 A1 | 3/2010 | Judd et al. |
| 2013/0116884 A1 | 5/2013 | Thomson et al. |
| 2013/0116996 A1 | 5/2013 | Callan |
| 2013/0131914 A1 | 5/2013 | Goebel et al. |

* cited by examiner

HEALTH MANAGEMENT UNIT AND METHOD FOR MONITORING HEALTH INFORMATION AND TRANSMITTING INFORMATION FROM THE AIRCRAFT

BACKGROUND OF THE INVENTION

Contemporary aircraft may include an Onboard Maintenance System (OMS) or a health monitoring or Integrated Vehicle Health Management (IVHM) system to assist in diagnosing or predicting faults in the aircraft. Such systems may collect various aircraft data for any irregularities or other signs of a fault or problem with the aircraft. High priority faults may be transmitted over a preconfigured interface. Contemporary aircraft have separate and independent communication units for management and configuration of radio interfaces. Further, each of the radios is also independent of each other. There is no coordination between them to ensure a message gets out.

BRIEF DESCRIPTION OF THE INVENTION

In one aspect, an embodiment of the invention relates to a method of monitoring health information of an aircraft and transmitting information from the aircraft, including determining, by a management unit, a priority level of a transmission, determining, by the management unit, capabilities of one or more radios onboard the aircraft, selecting, by the management unit, one of the multiple radios to transmit the transmission based on at least the determined priority level of the transmission, and transmitting the transmission utilizing the selected radio.

In another aspect, an embodiment of the invention relates to a health management unit for an aircraft having multiple systems for operating the aircraft and multiple radios for transmitting a message off the aircraft, having a health management module receiving health-related information from one or more of the multiple systems, and creating a health-related message from at least some of the health-related information along with a corresponding level of priority and a communication module controlling the assignment and transmission of the health-related message to one of the multiple radios based on the characteristics and priority of the health-related message.

DESCRIPTION OF EMBODIMENTS OF THE INVENTION

Figure 1:
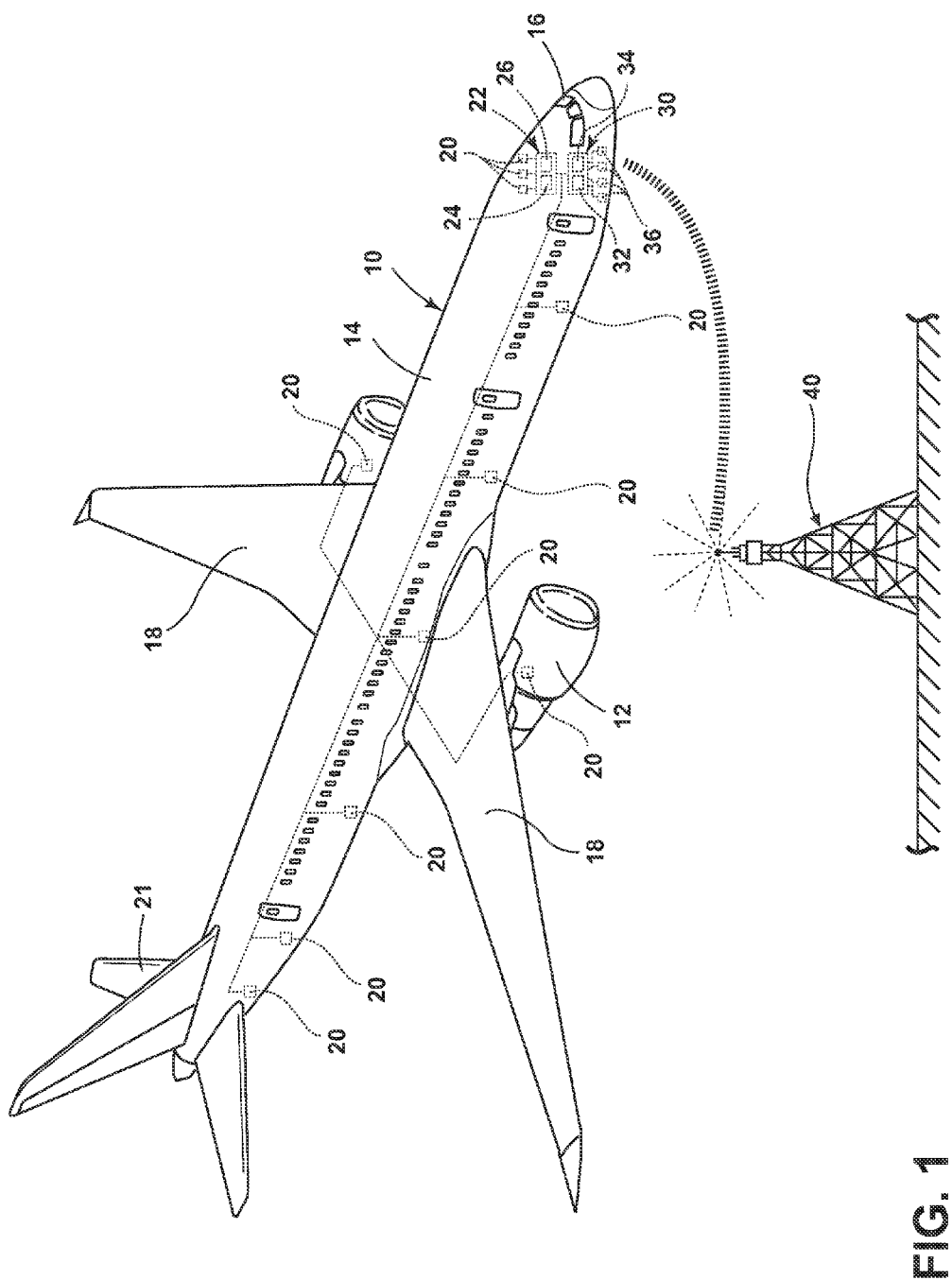
FIG. 1 is a perspective view of the aircraft in which embodiments of the invention may be implemented.

FIG. 1 schematically depicts a portion of an aircraft 10 that may execute embodiments of the invention and may include one or more propulsion engines 12 coupled to a fuselage 14, a cockpit 16 positioned in the fuselage 14, and wing assemblies 18 extending outward from the fuselage 14. While a commercial aircraft has been illustrated, it is contemplated that embodiments of the invention may be used in any type of legacy aircraft, for example, without limitation, fixed-wing, rotating-wing, rocket, personal aircraft, and military aircraft. A plurality of aircraft systems 20 that enable proper operation of the aircraft 10 may also be included in the aircraft 10 as well as one or more controllers 22, which may be operably coupled to the plurality of aircraft systems 20 to control their operation. While only a single controller 22 has been illustrated, it is contemplated that any number of controllers 22 may be included in the aircraft 10. The controller 22 may also be connected with other controllers of the aircraft 10. The controller 22 may include memory 24, the memory 24 may include random access memory (RAM), read-only memory (ROM), flash memory, or one or more different types of portable electronic memory, such as discs, DVDs, CD-ROMs, etc., or any suitable combination of these types of memory. The controller 22 may include one or more processors 26, which may be running any suitable programs. The controller 22 may be a portion of an FMS or may be operably coupled to the FMS.

Further, a health management unit 30 has been illustrated as being included within the aircraft 10. The health management unit 30 may also be operably coupled to any number of the plurality of aircraft systems 20 and/or the controller 22 to receive information therefrom. The health management unit 30 may include a health management module 32 and a communication module 34. The health management unit 30 as well as the health management module 32 and the communication module 34 may be implemented in any suitable software or hardware. For example, the health management unit 30 might include a general-purpose computing device in the form of a computer, including a processing unit, a system memory, and a system bus, that couples various system components including the system memory to the processing unit.

The health management unit 30 as well as the health management module 32 and the communication module 34 may include all or a portion of one or more computer programs having executable instruction sets for monitoring health information of the aircraft 10 and transmitting information from the aircraft 10. The program may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the technical effect of performing particular tasks or implementing particular abstract data types. Machine-executable instructions, associated data structures, and programs represent examples of program code for executing the exchange of information as disclosed herein. Machine-executable instructions may include, for example, instructions and data, which cause a general-purpose computer, special purpose computer, or special-purpose processing machine to perform a certain function or group of functions.

The health management module 32 may collect information received from one or more of the plurality of aircraft systems 20, create a transmission related to at least some of the collected information, and determine a level of priority of the transmission. More specifically, the health management module 32 may receive health-related information from one or more of the plurality of aircraft systems 20 and create a health-related message from at least some of the health-related information along with a corresponding level of priority. The health management module 32 may collect data from the various systems and the data can then be processed to determine the health of various components of the aircraft 10. For example, the health management module 32 may collect data from various aircraft systems such as engine/propulsion, critical structures such as landing gear and wings, flight controls and surfaces, hydraulic systems, electrical power systems and avionics. By comparing individual operational parameter data to its acceptable operating limits, failures of the components of the aircraft 10 may be detected and reported. Trends in parameter data may indicate normal usage, accelerated wear-out, and incipient failures. In this manner, the health management module 32 may detect existing faults and may include the ability to detect adverse trends that indicate future faults and report these. The term "health" as used throughout this specification is intended to mean the condition of a part or system of the aircraft 10 to perform the function required of it. The health management module 32 may process data relating to the aircraft, its flight performance, and selected signals related to health and usage and may compare such information to predetermined thresholds and determine a duration and/or extent by which any threshold is exceeded to determine a system or component health. For example, the health management module 32 may have the ability to determine faults including failures in the aircraft 10 through monitoring of conditions on the avionic buses. The health management module 32 may create a transmission based on information from at least one system or component of the aircraft 10 and may assign or determine a priority level for the transmission. It is contemplated that the health management module 32 may assign or determine the priority level from a list of predetermined priority levels including a highest priority, a second highest priority, a third highest priority and a lowest priority. Such priority levels may be determined based on a variety of various factors, which may be converted to an algorithm to determine which corresponding level of priority correlates with the transmission. Such an algorithm may be converted to a computer program comprising a set of executable instructions, which may be executed by the health management module 32.

The communication module 34 may be operably coupled to multiple radios 36 onboard the aircraft 10. By way of non-limiting example, the multiple radios 36 may include voice, ACARS-analog, ACARS-digital, SATCOM, Cellular, WiFi, etc. The voice interface may include voice capabilities from the flight crew to ground controllers or airlines operations center at a ground-based station 40. The ACARS-analog interface may include a bandwidth of ~2K bps over VHF radio to a ground-based station 40. The ACARS-digital interface may include a bandwidth of ~31K bps over VHF radio to a ground-based station 40. The SATCOM interface may include a bandwidth of 2K to 120K bps over various SATCOM providers, depending on equipment, data-plan, etc. The cellular interface may include a bandwidth of 10K to 100 M bps depending on global location and may only be used when the aircraft 10 is on the ground. The Wi-Fi interface may include a bandwidth of 20K to 6.77 Gbit/s depending on the airport location and available network access and may only be used when the aircraft 10 is on the ground. It will be understood that the above describe bandwidths are merely for illustrative purposes and by no means limit the scope of the invention. It will also be understood that the above described interfaces may have alternative bandwidths that vary from those listed above. For Example, the SATCOM may have L-band data speeds of up to 1.5 Mbit/s and High-speed Ka-Band service of up to 8 Mbit/s. It will also be understood that later-developed radios are certainly contemplated as within the scope of embodiments of the invention. While only one ground-based station 40 has been illustrated, it will be understood that the aircraft may communicate with multiple ground-based stations 40 utilizing the multiple radios 36.

The communication module 34 may be configured to manage capabilities of the multiple radios 36 onboard the aircraft 10 including determining what radio 36 to use to transmit the transmission. More specifically, the communication module 34 may control the assignment and transmission of the health-related message to one of the multiple radios 36 based on the characteristics and priority of the health-related message. The communication module 34 may also be configured to re-route communication paths to ensure continued operation of the management unit 30 and its transmission of information from the aircraft 10.

For example, the communication module 34 may be configured to determine what one of the multiple radios 36 to use in transferring the data based on the assigned or determined level of priority. Further, the communication module 34 may assess multiple factors in determining which of the multiple radios 36 to use in transferring the data. By way of non-limiting examples, the communication module 34 may also assess one of cost, bandwidth, availability of the multiple radios, current utilization of the multiple radios, the content of the transmission, or an amount of data to be transferred. Some of the factors may include characteristics of the health-related message while others may include characteristics of the multiple radios 36. Further, the communication module 34 may repeatedly assess the multiple factors in determining the one of the multiple radios.

During operation, the health management unit 30 may utilize inputs from the plurality of aircraft systems 20, the radios 36, the controller 20, etc. Among other things, the health management unit 30, or more specifically the health management module 32 of the health management unit 30 may receive health-related information and may create a message having a priority level. The communication module 34 may then control the assignment and transmission of the message to one of the multiple radios 36 as described above. In this manner, the health management unit 30 transmits information from the aircraft based on determinations by the health management module 32 and the communication module 34.

Figure 2:
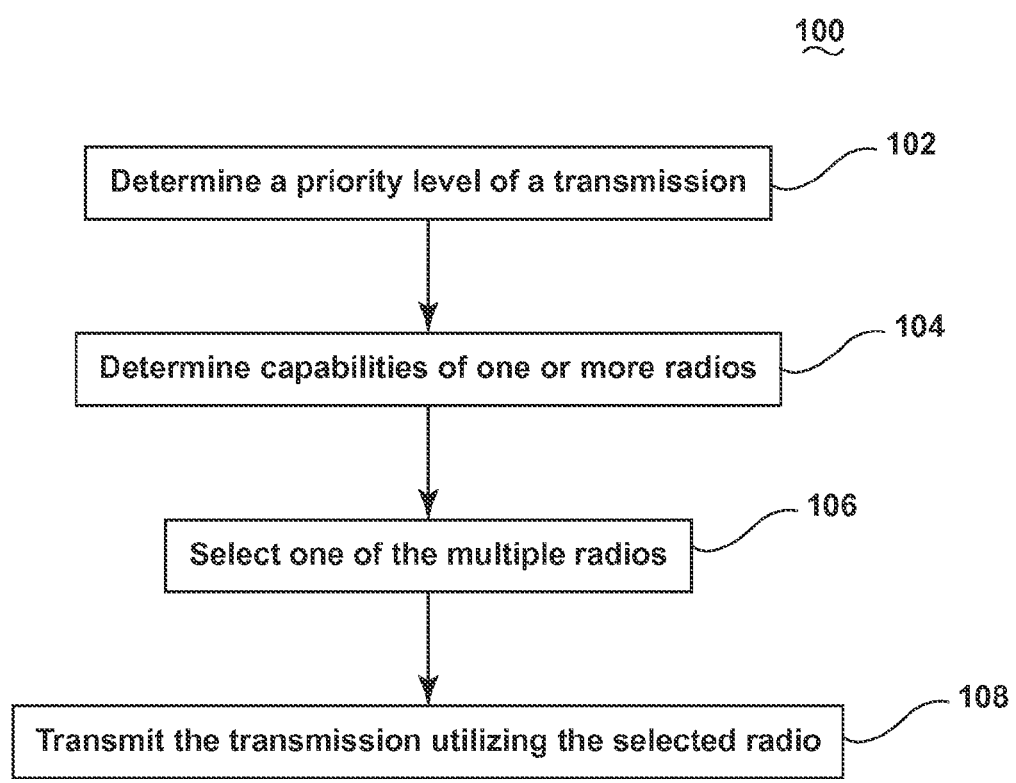
FIG. 2 is a flowchart showing a method of monitoring health information of an aircraft and transmitting information from the aircraft according to an embodiment of the invention.

In accordance with an embodiment of the invention, FIG. 2 illustrates a method 100, which may be used for monitoring health information of an aircraft and transmitting information from the aircraft. The method 100 begins at 102 by determining, a priority level of a transmission. It is contemplated that this may include the health management unit 30 determining a priority level set by another system of the aircraft or may include the health management unit 30 assigning a priority level based upon its own determination. A priority of the transmission may relate to the queuing and order of transmission from the aircraft 10. Any number of priority levels may be defined including, by way of non-limiting examples, Priority-1, Priority-2, Priority-3, and Priority-4. Alternatively, the priority levels may be defined as Major, Minor, Advisory, and Support. While the remainder of this document will discuss the Priority-1, Priority-2, Priority-3, and Priority-4 example, it will be understood that any priority levels may be defined including that the number of priority levels may vary. Further, any suitable alternative priority system may be in place on the aircraft 10.

By way of non-limiting examples, Priority-1 may be defined as the highest level and may pertain to information that must get off the aircraft as soon as possible. By way of non-limiting examples, Priority-1 may correlate to critical system faults including engine faults related to oil pressure, vibration, temperature, etc., low fuel faults, cabin pressure faults, cabin temperature faults, smoke faults, critical avionics faults, etc. Priority-2 may pertain to information that should get off the aircraft as soon as practical. By way of non-limiting examples, Priority-2 may correlate to information that provides only a low threat to the current flight. This may include routing changes due to traffic or weather or system warnings, information that may impact future flights such as trend data detecting deterioration, intermittent failure information, and failure of non-critical systems. This information may also be related to faults where a redundant system is still functioning. Priority-3 may include end-of-flight or post flight data and may relate to information regarding a status of the aircraft including any system failures, fuel quantity information, oil and hydraulics information, etc. The information may also be related to aircraft usage including hours used, load, weight, speeds, fuel burn, any high turbulence, and/or hard landing information. The information may also relate to Flight Operations Quality Assurance (FOQA) information including crew time, route, speeds, altitudes, power settings, abrupt maneuvers, etc. Further still, the information may relate to consumables and cabin service including water and lavatory information, food and supplies information, passenger entertainment information, retail and sales information. Priority-4 may be the lowest priority and may pertain to routine and/or high-quantity data, and/or information that is not time-critical. Such information may be related to maps that need to be updated periodically, flight management database information that needs to be updated periodically, raw data from the aircraft, software updates, etc.

At 104, capabilities of one or more radios 36 onboard the aircraft 10 may be determined by the health management unit 30. This may include that the health management unit 30 may determine if the radios are operative or inoperative, may determine if the radio is currently transmitting, and/or may determine if the radio interface may be used during the current portion of the flight plan. In this manner, the health management unit 30 may determine whether a radio 36 is available or unavailable due to failure, being out of range to a ground-based station, etc.

At 106, one of the multiple radios 36 that are available on the aircraft 10 may be selected by the health management unit 30 to transmit the transmission. The health management unit 30 may select the radio based on any suitable factors or rules. For example, the health management unit 30 may select the radio based on the level of priority of the transmission, the determined capabilities of the one or more radios including the availability of the multiple radios, a stage of flight determination, the content of the transmission including what system the transmission relates to, a size of the transmission, etc.

For Priority-1 transmissions, the selection may be based on the most available and reliable radio. This may include transmitting the information via voice to controller or airline operations center, via ACARS-analog, via ACARS-digital, and/or via SATCOM. Which transmission method is selected by the health management unit 30 for the Priority-1 transmission may be based on a variety of factors including availability of the interface based on location of the aircraft such as whether the aircraft is mid-ocean and has no coverage via some of the radios or is mid-continent, availability of the interface based on equipment failure, content of message including whether the message is text or data, etc.

For Priority-2 transmission, which transmission method is selected by the health management unit 30 may be based on a variety of factors including adhering to operations and cost-rules. Priority-2 transmissions may be transmitted via a number of radios including via voice to controller or airline operations center, via ACARS-analog, via ACARS-digital, and/or via SATCOM so long as such factors are adhered to. The health management unit 30 may wait to transmit the transmission until a preferred radio interface becomes available. Alternatively, the health management unit 30 may transmit a short message that more data will be coming later via a cheaper or more appropriate method.

Priority-3 transmissions may be transmitted via a number of radios including via SATCOM if the aircraft is in-flight, cellular if the aircraft is on the ground, or Wi-Fi if the aircraft is on ground. The health management unit 30 may select the radio interface to use based on factors such as cost-rules and availability. Priority-4 transmissions may be transmitted via a number of radios including cellular which has some costs, Wi-Fi, which is very-low or no-cost and may have better throughput than cellular but less availability, or hard-wired transfer such as Ethernet. The health management unit 30 may select the radio interface to use based on factors such as cost-rules and availability.

Any number of factors may be taken into consideration and the rules used to select the radio 36 may vary depending on each transmission. For example, aside from priority, the communication module 34 of the health management unit 30 may also make such a selection based on factors such as cost rules, bandwidth needed for the transmission, availability of the various radio interfaces, and current utilization of the radio interfaces (i.e. whether the radio interface is currently being used to transmit some other information). Based upon the data that needs to be transmitted, the various factors may be used by the health management unit 30 to consider what radio is selected. It is contemplated that the factors may not be weighted evenly and that a factor such as cost may be weighted more heavily. With respect to the current utilization factor, the health management unit 30 may need to determine how long to wait if the preferred interface is being used/busy or may need to determine if it wants to select a different radio interface. It is contemplated that the factors may be evaluated multiple times by the health management unit 30 such that the health management unit 30 may transmit the data over the best radio interface available.

In implementation, the various factors and any weighting thereof may be converted to an algorithm to determine which radio interface to select. Such an algorithm may be converted to a computer program comprising a set of executable instructions, which may be executed by the health management unit 30. In this manner, the health management unit 30 has visibility into the integrity of the aircraft systems and the ability to reallocate data for transmission based upon priority, aircraft system conditions, and optional routing paths. Once the radio has been selected, the transmission may be transmitted utilizing the selected radio at 108.

It will be understood that the method 100 of monitoring health information of an aircraft and transmitting information from the aircraft is flexible and the method 100 illustrated is merely for illustrative purposes. For example, the sequence of steps depicted is for illustrative purposes only, and is not meant to limit the method 100 in any way, as it is understood that the steps may proceed in a different logical order or additional or intervening steps may be included without detracting from embodiments of the invention. By way of non-limiting example, the method 100 may also include receiving data relevant to health information of an aircraft. This may include receiving raw aircraft data from which a health of a system or component may be determined. The health management unit 30 may monitor the health of the aircraft until a fault condition is detected. By way of further example, the health management unit 30 may create the transmission based on information from systems and/or components of the aircraft.

Technical effects of the above described embodiments include that the health data gathered by the aircraft may be transferred efficiently from the aircraft. The above embodiments provide a variety of benefits including that the management unit may provide communication capabilities and health management capabilities such that the management unit may determine an interface for data transmission based upon a preset of conditions or rules. In contemporary aircraft, a communication management unit is responsible for management and configuration of radio interfaces that an aircraft may use and a completely separate health management unit has the ability to determine failures in the aircraft. In contemporary aircraft, the communication management unit does not have visibility into the integrity of the aircraft systems and the ability to reallocate data for transmission and reception to radios; instead, if a transmission is directed to a radio that is inoperative the message is merely not transmitted. Similarly, in contemporary aircraft, the health management unit is not aware of the multiple interfaces available to it and high priority faults are transmitted over a preconfigured interface without any awareness of the current capabilities of the radio. The above embodiments allow for visibility into the integrity of the aircraft systems and the ability to reallocate data for transmission to various radios. A management unit having both communication management and health management also allows a physical avionics unit to be eliminated from the aircraft, which reduces overall weight and power requirements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of monitoring health information of an aircraft and transmitting information from the aircraft, comprising:
    determining, by a management unit, a priority level of a health information transmission;
    determining, by the management unit, capabilities of at least two radios of different protocols onboard the aircraft, wherein the capabilities comprises of:
 operative or inoperative status, currently transmitting status, and availability during current portion of a flight plan;
    selecting, by the management unit, one of the at least two radios to transmit the health information transmission based on at least the determined priority level of the health information transmission and the capabilities of the at least two radios; and
    transmitting the health information transmission utilizing the selected radio.

2. The method of claim 1 wherein the selecting comprises selecting one of the at least two radios based on the determined priority level, availability of the at least two radios, content of the health information transmission, and size of the health information transmission.

3. The method of claim 2 wherein the availability of the at least two radios comprises a current utilization of the at least two radios.

4. The method of claim 1 wherein the selecting comprises selecting one of the at least two radios based on the determined priority level and a stage of flight determination.

5. The method of claim 4 wherein the selecting further comprises selecting one of the at least two radios based on cost rules.

6. The method of claim 5 wherein the transmitting further comprises transmitting a short message that more data will be coming later via a cheaper or more appropriate method.

7. The method of claim 1 wherein the selecting further comprises selecting one of the at least two radios based on the determined capabilities of the at least two radios.

8. The method of claim 1 wherein determining the capabilities of the at least two radios comprises determining the availability of the at least two radios.

9. The method of claim 1, further comprising creating, by the management unit, the health information transmission based on information from at least one system or component of the aircraft.

10. The method of claim 1 wherein the selecting further comprises assessing multiple factors in selecting the one of the at least two radios.

11. The method of claim 10 wherein the multiple factors are repeatedly assessed.

12. A health management unit for an aircraft having multiple systems for operating the aircraft and multiple radios operating on different protocols for transmitting a message off the aircraft, the health management unit comprising:
    a health management module receiving health-related information from one or more of the multiple systems, and creating a health-related message from at least some of the health-related information along with a corresponding priority level; and
    a communication module controlling assignment and transmission of the health-related message to one of the multiple radios operating on different protocols based on capabilities of the multiple radios, wherein the capabilities comprises of: operative or inoperative status, currently transmitting status, and availability during current portion of a flight plan, and priority of the health-related message.

13. The health management unit of claim 12 wherein the assignment and transmission of the health-related message is further based on cost, bandwidth, availability, and current utilization.

14. The health management unit of claim 12 wherein the health management module determines the priority level from a list of predetermined priority levels including a highest priority, a second highest priority, a third highest priority and a lowest priority.

15. The health management unit of claim 12 wherein the multiple radios comprise voice, ACARS-analog, ACARS-digital, SATCOM, Cellular, and WIFi.

* * * * *